United States Patent [19]
Hattori et al.

[11] Patent Number: 5,799,517
[45] Date of Patent: Sep. 1, 1998

[54] VEHICLE LOCKING DEVICE

[75] Inventors: Masaichi Hattori; Osamu Shoji, both of Aichi, Japan

[73] Assignee: Kabushiki Kaisha Tokai Rika Denki Seisakusho, Aichi, Japan

[21] Appl. No.: 515,618

[22] Filed: Aug. 16, 1995

[30] Foreign Application Priority Data

Aug. 30, 1994 [JP] Japan ................ 6-205383

[51] Int. Cl.⁶ ............................ B60R 25/06
[52] U.S. Cl. .................. 70/247; 192/4 A; 70/277; 70/283; 292/144
[58] Field of Search ............ 70/247, 245, 248, 70/275, 277, 279, 280, 282, 283; 292/144; 192/4 A; 74/484 R

[56] References Cited

U.S. PATENT DOCUMENTS

| | | | |
|---|---|---|---|
| 5,127,245 | 7/1992 | Imai et al. | 192/4 A |
| 5,150,593 | 9/1992 | Kobayashi et al. | 192/4 A |
| 5,216,909 | 6/1993 | Arnoogam | 292/144 |
| 5,218,847 | 6/1993 | Dieden et al. | 70/247 |
| 5,226,303 | 7/1993 | Dieden et al. | 70/247 |
| 5,309,744 | 5/1994 | Kito et al. | 70/247 |
| 5,456,133 | 10/1995 | Sogo et al. | 192/4 A |
| 5,582,073 | 12/1996 | Takeuchi et al. | 192/4 A |

FOREIGN PATENT DOCUMENTS 4206250  9/1992  Germany.

*Primary Examiner*—Darnell M. Boucher
*Attorney, Agent, or Firm*—Finnegan, Henderson, Farabow, Garrett & Dunner, L.L.P.

[57] ABSTRACT

A stopper plate includes a through hole to which a lock plate moving in an arrow Y direction when a detent knob is operated can make access and a trapezoidal part contiguous to the through hole. It can move back and forth between a lock position where the trapezoidal part is opposed to the lock plate and an unlock position where the through hole 13a is opposed to the lock plate, it is energized in the unlock position by a first compression coil spring at the normal time. A cam member is coupled to the stopper plate via a second compression coil spring 18 having a spring force larger than the first compression coil spring, and receives a move force in an unlock position direction by cam action between the cam member and the lock plate. A spring force of the second compression coil spring is set smaller than the resultant force of a plunger holding force by an electromagnetic solenoid and a spring force of the first compression coil spring.

3 Claims, 15 Drawing Sheets

VEHICLE LOCKING DEVICE

BACKGROUND OF THE INVENTION

1. Field of the Invention

This invention relates to a vehicle locking device that can be used for an automobile shift locking device, etc.

2. Related Art

A general shift locking device installed in an automobile is designed so that an automatic transmission cannot be operated from a parking position to any other position unless a foot brake is stepped on when the automobile is started. FIGS. 28 and 29 show structure examples of the main part of such a shift locking device.

In FIGS. 28 and 29, a lock plate 1 is moved in an arrow A direction in FIG. 28 when a detent knob mounted on a shift lever (not shown) for shift position change is pressed; it is energized and held in the position shown in the figure at the normal time. A stopper 3 supported via a shaft 2a on a fixed plate 2 has one end pivotable between a lock position (indicated by a solid line in FIG. 29) blocking a move of the lock plate 1 in the arrow A direction and an unlock position (indicated by an alternate long and two short dashes line in FIG. 29) allowing a move of the lock plate 1 in the arrow A direction.

The stopper 3 has the other end coupled pivotably to a plunger 4a of an electromagnetic solenoid 4. When the electromagnetic solenoid 4 is energized, the stopper 3 is moved to the unlock position. The electromagnetic solenoid 4 is provided with a compression coil spring 5 for return. When the electromagnetic solenoid 4 is powered off, the stopper 3 is held in the lock position by a spring force of the compression coil spring 5 for return. The electromagnetic solenoid 4 is powered off at the normal time and is energized only when an accessory circuit of the automobile is formed and the foot brake is stepped on in a condition in which the automatic transmission is in the parking position.

Therefore, when the electromagnetic solenoid 4 is powered off, the stopper 3 is held in the lock position by the spring force of the compression coil spring 5 for return, blocking a move of the lock plate 1 in the arrow A direction for making pressing of a detent pin ineffective. When the electromagnetic solenoid 4 is energized, the stopper 3 is pivoted to the unlock position by the electromagnetic solenoid 4, allowing the move of the lock plate 1 in the arrow A direction for making pressing of the detent pin effective.

In the structure, since the compression coil spring 5 for return is mounted, the electromagnetic solenoid 4 must perform suction operation against the spring force of the compression coil spring 5 for return to move the stopper 3 from the lock position to the unlock position. Therefore, the generation force of the electromagnetic solenoid 4 needs to be made comparatively large, scaling up the electromagnetic solenoid 4 is inevitable, and spatial limitation increases when the electromagnetic solenoid 4 is built in the shift lever. When the electromagnetic solenoid 4 is energized, operation noise occurs as the plunger moves, causing noise to increase.

SUMMARY OF THE INVENTION

It is therefore an object of the invention to provide a vehicle locking device producing effects of miniaturizing an electromagnetic solenoid and suppressing noise at the same time.

To the ends, according to the invention, there is provided a vehicle locking device for selectively making operation of an operational member ineffective, the vehicle locking device comprising an interlocking member moving in a predetermined operational direction in conjunction with operation of the operational member, a stopper member movable back and force between a lock position where when the interlocking member is moved in the operational direction, the stopper member abuts the interlocking member for inhibiting the interlocking member from moving and an unlock position where the stopper member retracts from a move path of the interlocking member for allowing the interlocking member to move, an electromagnetic solenoid having a plunger coupled to the stopper member for holding the stopper member in the unlock position when the electromagnetic solenoid is energized, first spring means for energizing the stopper member in a direction of the unlock position at the normal time, and a driven member being coupled to the stopper means via second spring means having a spring force larger than the first spring means for giving a move force in a direction of the lock position to the stopper member through the second spring means in response to a move of the interlocking member in the operational direction, wherein the spring force of the second spring means is set to a smaller value than a resultant force of a plunger holding force by the electromagnetic solenoid and the spring force of the first spring means.

In this case, the driven member may be a cam member for giving the move force in the lock position direction to the stopper member through the second spring means by cam action responsive to abutment against the interlocking member when the interlocking member is moved in the operational direction.

According to the invention, there is provided a vehicle locking device for selectively making operation of an operational member ineffective, the vehicle locking device comprising an interlocking member moving in a predetermined operational direction in conjunction with operation of the operational member, a stopper member movable back and force between a lock position where when the interlocking member is moved in the operational direction, the stopper member abuts the interlocking member for inhibiting the interlocking member from moving and an unlock position where the stopper member retracts from a move path of the interlocking member for allowing the interlocking member to move, an electromagnetic solenoid having a plunger coupled to the stopper member for holding the stopper member in the unlock position when the electromagnetic solenoid is energized, a driven member for pressing the stopper means by a spring force of driven member spring means for holding the stopper member in the unlock position at the normal time, the driven member being displaced to a position where pressing the stopper member is released in response to a move of the interlocking member in the operational direction, allowing the stopper means to move in a direction of the lock position, and stopper member spring means for energizing the stopper member in the lock position direction at the normal time, wherein a spring force of the stopper member spring means is set to a smaller value than each of the spring force of the driven member spring means and a plunger holding force by the electromagnetic solenoid.

In this case, the driven member may be a cam member displaced by cam action responsive to abutment against the interlocking member when the interlocking member is moved in the operational direction.

In the vehicle locking device of the invention, the stopper member is energized in the unlock position direction by the first spring means at the normal time and is in the unlock position regardless of whether or not the electromagnetic solenoid is energized. When the operational member is operated, the driven member gives the move force in the lock position direction to the stopper member through the second spring means as the interlocking member is moved in the operational direction.

When the operational member is operated, if the electromagnetic solenoid is powered off, the force of holding the stopper member in the unlock position is only the spring force of the first spring means. Since the spring force is smaller than the spring force of the second spring means for transmitting a move force between the stopper member and the driven member, the stopper member is moved in the lock position direction against the first spring means as the operational member is operated as described above. Thus, the interlocking member abuts the stopper member, inhibiting the interlocking member from moving, so that operation of the operational member is made ineffective.

In contrast, when the operational member is operated, if the electromagnetic solenoid is energized, the force of holding the stopper member in the unlock position is the resultant force of the plunger holding force by the electromagnetic solenoid and the spring force of the first spring means. In this case, since the spring force of the second spring means is set to a smaller value than the resultant force, when the move force in the lock position direction is given to the stopper member through the second spring means in response to the operation of the operational member, only the driven member is moved as the second spring means is deformed, and the stopper member remains held in the unlock position. Thus, the state in which the stopper member is retracted from the move path of the interlocking member is held, allowing the interlocking member to move in the operational direction, so that the operation of the operational member is made effective.

In this case, the electromagnetic solenoid needs only to hold the stopper member in the unlock position at the normal time in the unlock position and need not give a large force, thus can be miniaturized. Moreover, when the electromagnetic solenoid is energized, the plunger does not move, so that operation noise associated with the move does not occur, preventing noise from increasing.

In the vehicle locking device of the invention, when the operational member is operated, the move force in the lock position direction is given to the stopper member through the second spring means by cam action responsive to abutment of the interlocking member moved in the operational direction and the driven member as the cam member; the move force can be transmitted reliably.

In the vehicle locking device of the invention, since the spring force of the stopper member spring means for energizing the stopper member in the lock position direction is set to a smaller value than the spring force of the driven member spring means for exerting the spring force on the driven member, the driven member presses the stopper member by the spring force of the driven member spring means for holding the stopper member in the unlock position at the normal time. When the operational member is operated, as the interlocking member is moved in the operational direction, the driven member is displaced to the position where pressing the stopper member is released, allowing the stopper member to move in the lock position direction.

When the operational member is operated, if the electromagnetic solenoid is powered off, the stopper member is moved in the lock position direction by the stopper member spring means. Thus, the interlocking member abuts the stopper member, inhibiting the interlocking member from moving for making operation of the operational member ineffective.

In contrast, when the operational member is operated, if the electromagnetic solenoid is energized, since the spring force of the stopper member spring means is set to a smaller value than the plunger holding force by the electromagnetic solenoid, even when the driven member is displaced as described above in response to the operation of the operational member and the stopper member is allowed to move in the lock position direction, the stopper member remains held in the unlock position by the plunger holding force. Thus, the state in which the stopper member is retracted from the move path of the interlocking member is held, allowing the interlocking member to move in the operational direction, so that the operation of the operational member is made effective.

Also in this case, the electromagnetic solenoid needs only to hold the stopper member in the unlock position at the normal time in the unlock position and need not give a large force, thus can be miniaturized. Moreover, operation noise associated with a move of the electromagnetic solenoid does not occur, preventing noise from increasing.

In the vehicle locking device of the invention, the driven member is formed as the cam member displaced by cam action responsive to abutment against the interlocking member moved in the operational direction when the operational member is operated, so that transmission of the move force from the interlocking member to the driven member can be executed reliably.

DETAILED DESCRIPTION OF THE PREFERRED EMBODIMENTS

First Embodiment

A first embodiment of applying the invention to an automobile shift locking device will be discussed with reference to FIGS. 1 to 3.

Figure 1A:
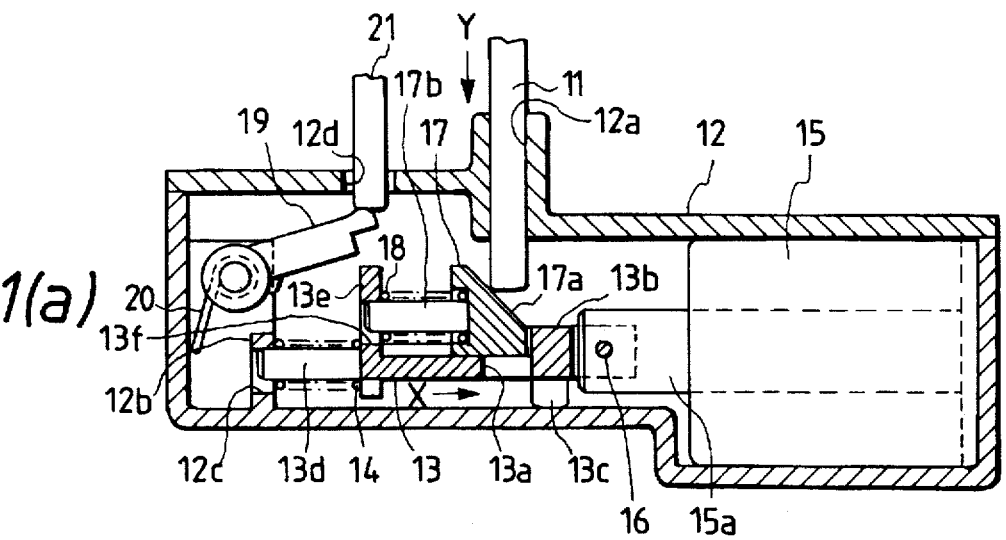
FIGS. 1(a) to (c) are longitudinal sectional side views showing a first embodiment of the invention in different conditions.
Figure 1B:
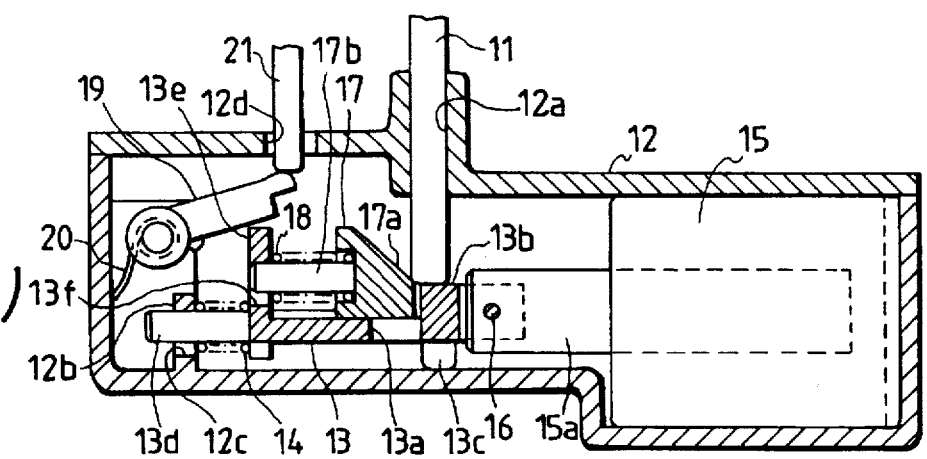
Figure 1C:
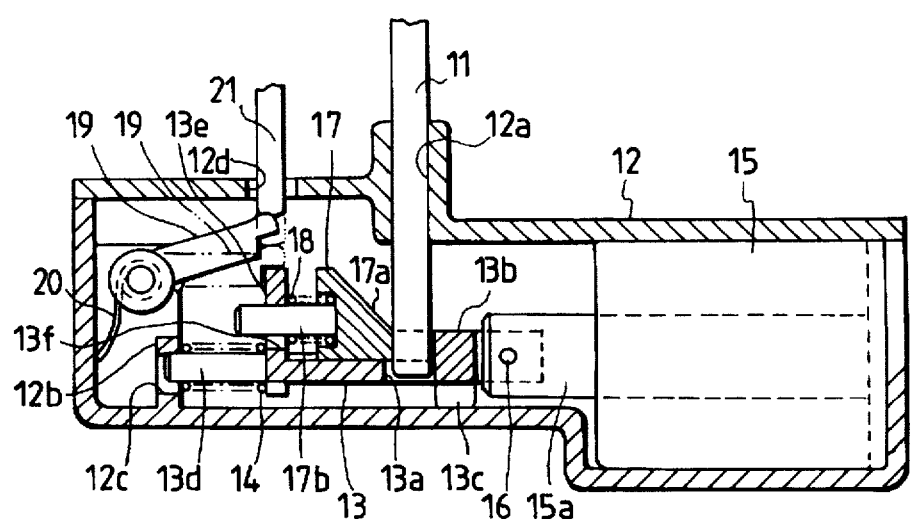
Figure 2:
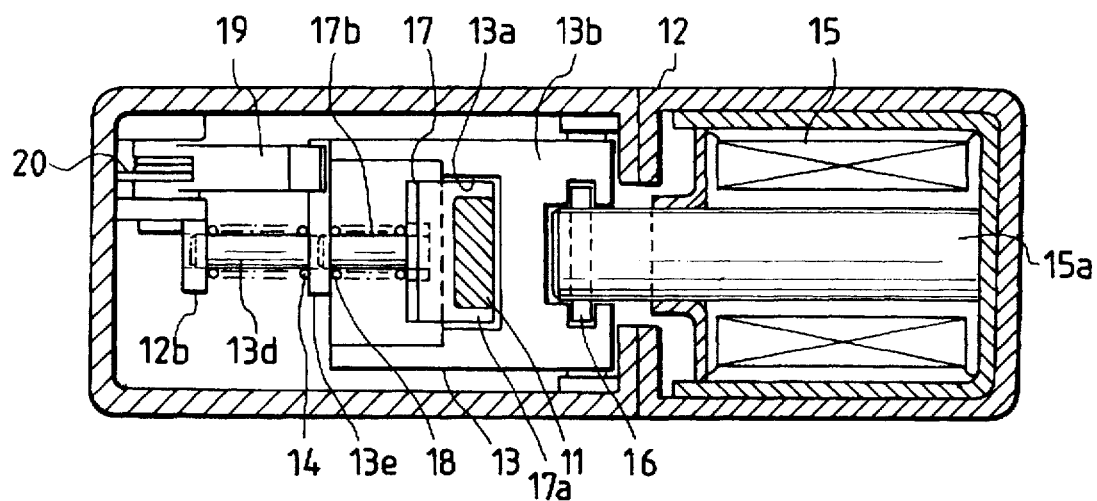
FIG. 2 is a transverse sectional plan view.
Figure 3:
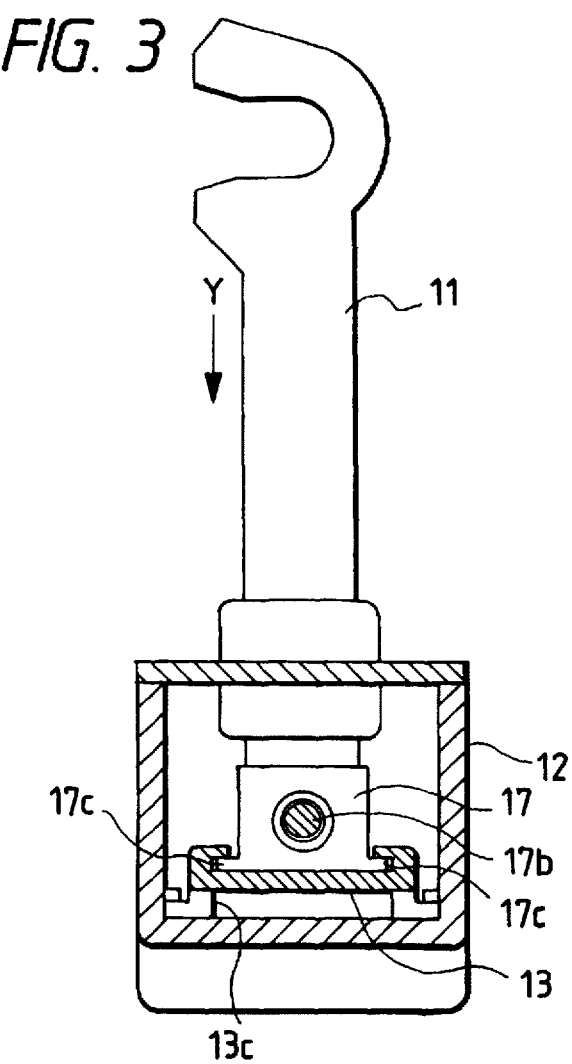
FIG. 3 is a longitudinal sectional front view.

In FIGS. 1 to 3, a lock plate 11 as an interlocking member is mounted movably in its longitudinal direction (vertical direction in FIGS. 1 and 3). When a detent knob of a known structure that an automatic transmission shift lever (not shown) has is pressed, the lock plate 11 is moved in an arrow Y direction in FIGS. 1 and 3, an operational direction. A rectangular case 12, which is fixed to a proper still part, is formed with a guide hole 12a into which the lock plate 11 is inserted on the central top face.

A stopper plate 13 as a stopper member is installed in the case 12 movably in a direction perpendicular to the move direction of the lock plate 11. Specifically, the stopper plate 13 is formed with a through hole 13a to which the lock plate 11 can make access from the tip and a trapezoidal part 13b contiguous to the through hole 13a, and can move back and forth between a lock position (see FIG. 1 (b)) where the trapezoidal part 13b is opposed to the tip of the lock plate 11 from downward and an unlock position (see FIG. 1 (a), (c)) where the trapezoidal part 13b is retracted from a move path of the tip of the lock plate 11, namely, the through hole 13a is opposed to the tip of the lock plate 11 from downward. The stopper plate 13 comprises a leg part 13c making sliding contact with the bottom of the case 12 and a guide pin 13d projected in the move direction. The guide pin 13d is inserted into a guide hole 12c of a rib 12b located upright on the bottom of the case 12.

A first compression coil spring 14 is wound surrounding the guide pin 13d so as to exert a spring force in an elongation direction between the rib 12b and the stopper plate 13, whereby the stopper plate 13 is energized in an unlock position direction (arrow X direction in FIG. 1 (a)) at the normal time.

The end opposite to the guide pin 13d at the stopper plate 13 is coupled via a pin 16 to a plunger 15a of an electromagnetic solenoid 15 housed in the case 12. When the electromagnetic solenoid 15 is energized, it holds a state in which the plunger 15a is stuck to a core (not shown). In response to this, the stopper plate 13 is held in the unlock position. The electromagnetic solenoid 15 is energized only when an accessory circuit of the automobile is formed and a foot brake is applied in a condition in which the automatic transmission is in a parking position.

A rising wall 13e is located upright on the end opposite to the trapezoidal part 13b at the stopper plate 13 and a cam member 17 as a driven member movable between the trapezoidal part 13b and the rising wall 13e is put on the stopper plate 13. The cam member 17 comprises a cam face 17a facing the tip (lower end) of the lock plate 11 when the cam member 17 is in a position covering the through hole 13a of the stopper plate 13. When the lock plate 11 is moved in the arrow Y direction, a move force in the opposite arrow X direction is given by cam action responsive to abutment of the tip against the cam face 17a.

The cam member 17 further includes a coupling pin 17b projected in a direction opposite to the cam face 17a and the coupling pin 17b is inserted into a through hole 13f made in the rising wall 13e on the side of the lock plate 13. A second compression coil spring 18 is wound surrounding the coupling pin 17b so as to exert a spring force in an elongation direction between the rising wall 13e and the cam member 17, whereby the cam member 17 is coupled via the second compression coil spring 18 to the stopper plate 13 and is energized in a position direction covering the through hole 13a on the side of the stopper plate 13 at the normal time.

In this case, the second compression coil spring 18 has a spring force larger than the first compression coil spring 14 and the spring force is set so as to become smaller than the resultant force of the holding force of the plunger 15a by the electromagnetic solenoid 15 and the spring force of the first compression coil spring 14.

The cam member 17 has protrusions 17c and 17c on both sides of the lower edge as shown in FIG. 3 and the protrusions 17c and 17c are engaged in guide grooves formed in the side of the stopper plate 13.

A cancel lever 19 installed in the case 12 pivotally travels between an operational position (indicated by an alternate long and two short dashes line in FIG. 1 (c)) where the stopper plate 13 in the unlock position abuts the rising wall 13e and is inhibited from moving in the opposite arrow X direction and an operation stop position (see solid lines in FIGS. 1 (a), (b), and (c)) above the operational position. It is held in the operation stop position by a torsion coil spring 20 at the normal time. A cancel pin 21 is inserted into a through hole 12d made in the top face of the case 12. The cancel lever 19 can be pivoted to the operation position by depressing the cancel pin 21.

Next, the operation of the structure of the embodiment will be discussed.

The stopper plate 13, which is energized in the unlock position direction by the first compression coil spring 14 at the normal time, is moved to the unlock position regardless of whether or not the electromagnetic solenoid 15 is energized, and the cam member 17 has the cam face 17a in a position opposed to the tip of the lock plate 11 (state in FIG. 1 (a)).

When the lock plate 11 is moved in the operational direction (arrow Y direction) as the detent knob (not shown) is pressed from the state, a move force in the opposite arrow X direction is given to the cam member 17 by cam action responsive to abutment of the tip of the lock plate 11 against the cam face 17a of the cam member 17. The move force is applied to the stopper plate 13 through the second compression coil spring 18.

When the detent knob is pressed, if the electromagnetic solenoid 15 is powered off, the force holding the stopper plate 13 in the unlock position is only the spring force of the first compression coil spring 14. Since the spring force is smaller than the spring force of the second compression coil spring 18 transmitting the move force between the stopper plate 13 and the cam member 17, the stopper plate 13 is moved in a lock position direction (opposite arrow X direction) from the unlock position against the first compression coil spring 14 as the detent knob is pressed as described above.

When the stopper plate 13 is thus moved to the lock position, as shown in FIG. 1 (b), the tip of the lock plate 11 abuts the trapezoidal part 13b of the stopper plate 13, inhibiting the lock plate 11 from moving, thus more pressing the detent knob is made ineffective.

In contrast, when the detent knob is pressed, if the electromagnetic solenoid 15 is energized, it attracts and holds the plunger 15a. In this state, the force holding the stopper plate 13 in the unlock position is the resultant force of the force holding the plunger 15a by the electromagnetic solenoid 15 and the spring force of the first compression coil spring 14. In this case, since the spring force of the second compression coil spring 18 is set to a smaller value than the resultant force, when the move force in the lock position direction is given through the cam member 17 and the second compression coil spring 18 to the stopper plate 13 in response to pressing the detent knob, only the cam member 17 is moved in response to compressed deformation of the compression coil spring 18 and the stopper plate 13 remains held in the unlock position direction, as shown in FIG. 1 (c). Thus, the through hole 13a of the stopper plate 13 faces the tip of the lock plate 11 and the lock plate 11 makes access to the through hole 13a, allowing the lock plate 11 to move in the arrow Y direction for making pressing the detent knob effective.

To make pressing the detent knob effective when the electromagnetic solenoid 15 cannot be energized for some reason, the detent knob may be pressed with the cancel pin 21 depressed. That is, when the cancel pin 21 is depressed, the cancel lever 19 is pivoted to the operational position for holding the stopper plate 13 in the unlock position, thus pressing the detent knob is made effective.

According to the structure of the embodiment, the electromagnetic solenoid 15 needs only to hold the stopper plate 13 held in the unlock position at the normal time in the unlock position and need not perform suction operation against the spring force as in the conventional structure, and therefore can be miniaturized. Moreover, when the electromagnetic solenoid 15 is energized, the plunger 15a does not move, so that operation noise associated with the move does not occur, preventing noise from increasing. Since the cam action of the cam member 17 is used to transmit the move force between the lock plate 11 and the stopper plate 13, the move force can be transmitted reliably.

Second Embodiment

Figure 4:
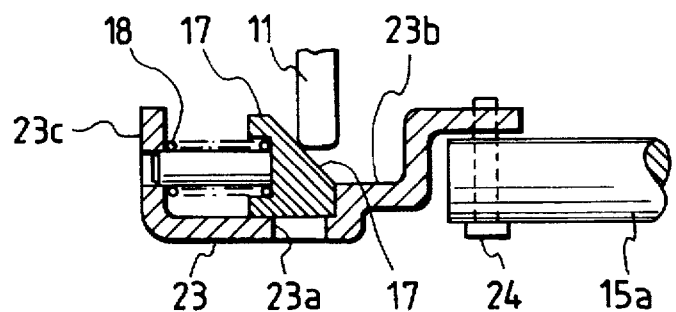
FIG. 4 is a longitudinal sectional side view of a main part showing a second embodiment of the invention.
Figure 5:
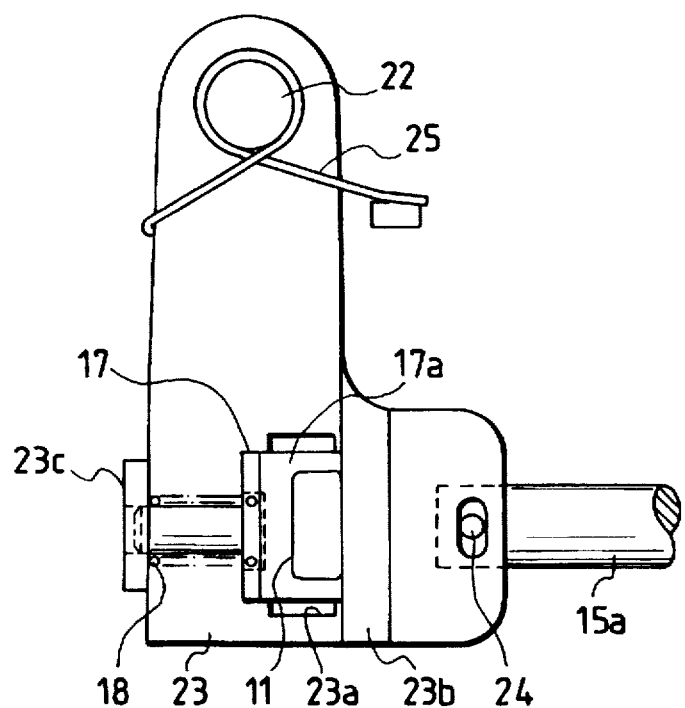
FIG. 5 is a plan view of the main part in FIG. 4.

FIGS. 4 and 5 show the main part of a second embodiment of the invention producing a similar effect to that of the first embodiment. Only the differences between the first and second embodiments will be discussed.

In the second embodiment, a stopper plate 23 pivoting about a support shaft 22 as a supporting point is installed as a stopper member in place of the stopper plate 13 in the first embodiment, and the stopper plate 23 and a plunger 15a of an electromagnetic solenoid 15 are coupled by a pin 24. The stopper plate 23 is formed with a through hole 23a to which a lock plate 11 can make access from the tip and a trapezoidal part 23b contiguous to the through hole 23a, and can pivotally travel between a lock position where the trapezoidal part 23b is opposed to the tip of the lock plate 11 from downward and an unlock position where the through hole 23a is opposed to the tip of the lock plate 11 from downward.

A torsion coil spring 25 for energizing the stopper plate 23 in an unlock position direction at the normal time is wound around the base end of the stopper plate 23. The spring force of the torsion coil spring 25 is set so that it becomes smaller than the spring force of a compression coil spring 18 intervening between a cam member 17 and a rising wall 23c formed on the stopper plate 23 and that the resultant force of the spring force of the torsion coil spring 25 and the force holding the plunger 15a by the electromagnetic solenoid 15 becomes larger than the spring force of the compression coil spring 18.

Therefore, in such a structure, the stopper plate 23, which is also energized in the unlock position direction by the torsion coil spring 25 at the normal time, is moved to the unlock position regardless of whether or not the electromagnetic solenoid 15 is energized, and the cam member 17 has a cam face 17a opposed to the tip of the lock plate 11. Therefore, pressing a detent knob is made effective or ineffective as the electromagnetic solenoid 15 is energized or powered off as in the first embodiment.

Third Embodiment

Figure 6:
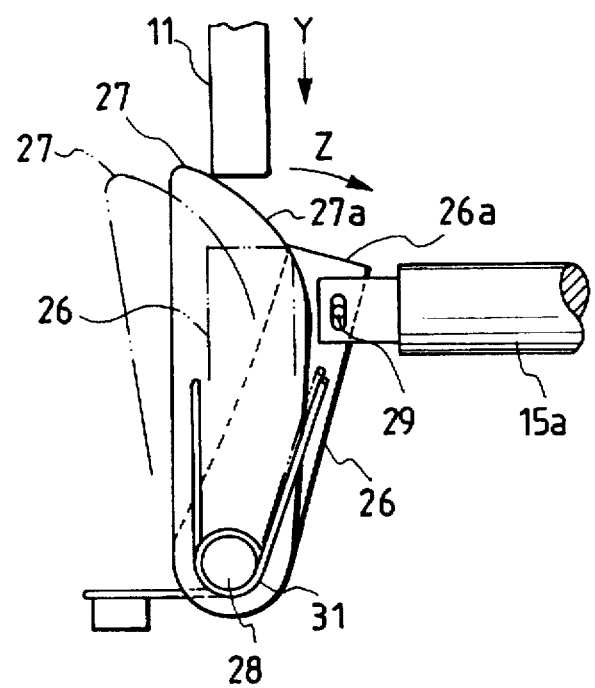
FIG. 6 is a side view of a main part showing a third embodiment of the invention.
Figure 7:
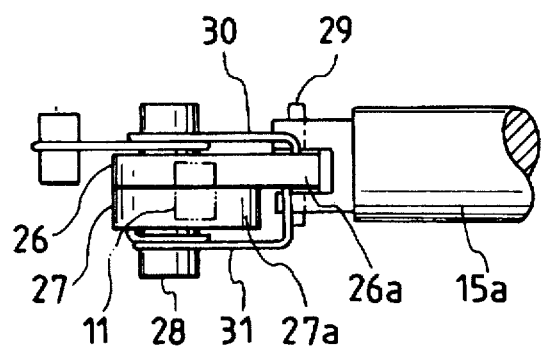
FIG. 7 is a plan view of the main part in FIG. 6.

FIGS. 6 and 7 show the main part of a third embodiment of the invention producing a similar effect to that of the first embodiment. Only the differences between the first and third embodiments will be discussed.

A stopper plate 26 as a stopper member and a cam plate 27 as a driven member are mounted pivotably in arrow Z and opposite arrow Z directions in FIG. 6 via the same support shaft 28.

The stopper plate 26 can move back and forth between a lock position (see the alternate long and two short dashes line in FIG. 6) where a tip face 26a of the stopper plate 26 is opposed to the tip of a lock plate 11 from downward and an unlock position (see the solid line in FIG. 6) where the tip face 26a is retracted from a move path of the lock plate 11. The stopper plate 26 is coupled via a pin 29 to a plunger 15a of an electromagnetic solenoid 15. In this case, a first torsion coil spring 30 for energizing the stopper plate 26 in an unlock position direction (arrow Z direction) at the normal time is wound around the side part of the stopper plate 26 at the support shaft 28.

A second torsion coil spring 31 is also wound around the side part of a cam plate 27 at the support shaft 28. The torsion coil spring 31 has one end coupled to the cam plate 27 and the other end coupled to the stopper plate 26, whereby the cam plate 27 is coupled via the second torsion coil spring 31 to the stopper plate 26 and at the normal time, is energized and held in a position where a cam face 27a of the tip is opposed to the tip of the lock plate 11. In this case, the second torsion coil spring 31 has a spring force larger than the first torsion coil spring 30 and the spring force is set so as to become smaller than the resultant force of the holding force of the plunger 15a by the electromagnetic solenoid 15 and the spring force of the first torsion coil spring 30.

According to the embodiment having the structure, the stopper plate 26, which is energized in the unlock position direction by the first torsion coil spring 30 at the normal time. is held in the unlock position regardless of whether or not the electromagnetic solenoid 15 is energized. When the lock plate 11 is moved in the arrow Y direction as a detent knob (not shown) is pressed from the state, a move force in the opposite arrow Z direction is given to the cam plate 27 by cam action responsive to abutment of the tip of the lock plate 11 against the cam face 27a of the cam plate 27. The move force is applied to the stopper plate 26 through the second torsion coil spring 31.

When the detent knob is pressed, if the electromagnetic solenoid 15 is powered off, the force holding the stopper plate 26 in the unlock position is only the spring force of the first torsion coil spring 30. Since the spring force is smaller than the spring force of the second torsion coil spring 31, the stopper plate 26 is moved in a lock position direction (opposite arrow Z direction) from the unlock position against the first torsion coil spring 30 as the detent knob is pressed as described above.

When the stopper plate 26 is thus moved to the lock position, the tip of the lock plate 11 abuts the tip face 26a of the stopper plate 26, inhibiting the lock plate 11 from moving. thus pressing the detent knob is made ineffective.

In contrast, when the detent knob is pressed, if the electromagnetic solenoid 15 is energized, it attracts and holds the plunger 15a. In this state, the force holding the stopper plate 26 in the unlock position is the resultant force of the force holding the plunger 15a by the electromagnetic solenoid 15 and the spring force of the first torsion coil spring 30. In this case, since the spring force of the second torsion coil spring 31 is set to a smaller value than the resultant force. when the move force in the lock position direction is given to the stopper plate 26 in response to pressing the detent knob. only the cam plate 27 is moved in the opposite arrow Z direction in response to spread deformation of the torsion coil spring 31 and the stopper plate 26 remains held in the unlock position. Thus, the tip face 26a of the stopper plate 26 is retracted from the move path of the lock plate 11, allowing the lock plate 11 to move in the arrow Y direction for making pressing the detent knob effective.

Fourth Embodiment

Figure 8:
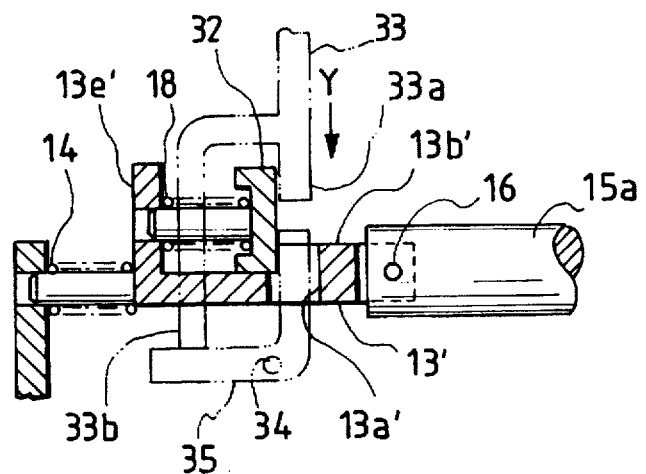
FIG. 8 is a longitudinal sectional view of a main part showing a fourth embodiment of the invention.
Figure 9:
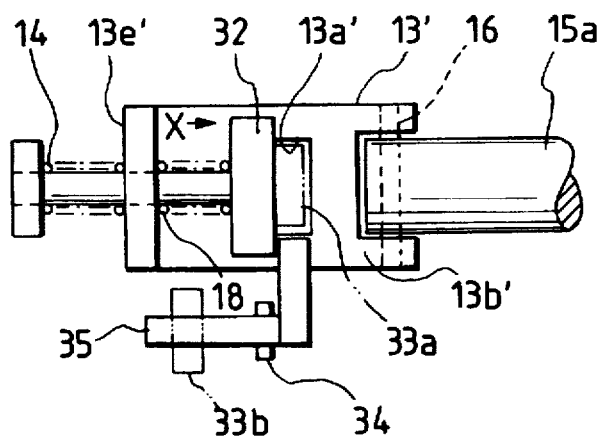
FIG. 9 is a plan view of the main part in FIG. 8.

FIGS. 8 and 9 show the main part of a fourth embodiment of the invention producing a similar effect to that of the first embodiment. Only the differences between the first and fourth embodiments will be discussed.

A slider 32 as a driven member is placed on a stopper plate 13' of a form similar to that of the stopper plate 13 in the first embodiment movably between a trapezoidal part 13b' and a rising wall 13e' of the stopper plate 13'. When a detent knob is pressed, a lock plate 33 as an interlocking member is moved in an arrow Y direction, an operational direction; it has a main part 33a related to a through hole 13a' of the stopper plate 13' and an auxiliary arm 33b branching from the main part 33a.

When the lock plate 33 is moved in the arrow Y direction, a trip arm 35 installed pivotally about a support shaft 34 as a support point is pressed and pivoted by the auxiliary arm 33b; as it is pivoted, the slider 32 is moved in the opposite arrow X direction.

The stopper plate 13' is coupled via a pin 16 to a plunger 15a of an electromagnetic solenoid 15 and at the normal time, is energized in the arrow X direction by a compression coil spring 14. The slider 32 is coupled via a compression coil spring 18 to the stopper plate 13'.

Therefore, also in the embodiment having the structure, as in the first embodiment, when the lock plate 33 is moved in the arrow Y direction by pressing the detent knob, the stopper plate 13' is moved to a lock position when the electromagnetic solenoid 15 is powered off, and remains held in an unlock position when the electromagnetic solenoid 15 is energized, making pressing the detent knob effective or ineffective as the electromagnetic solenoid 15 is energized or powered off.

Fifth Embodiment

Figure 10A:
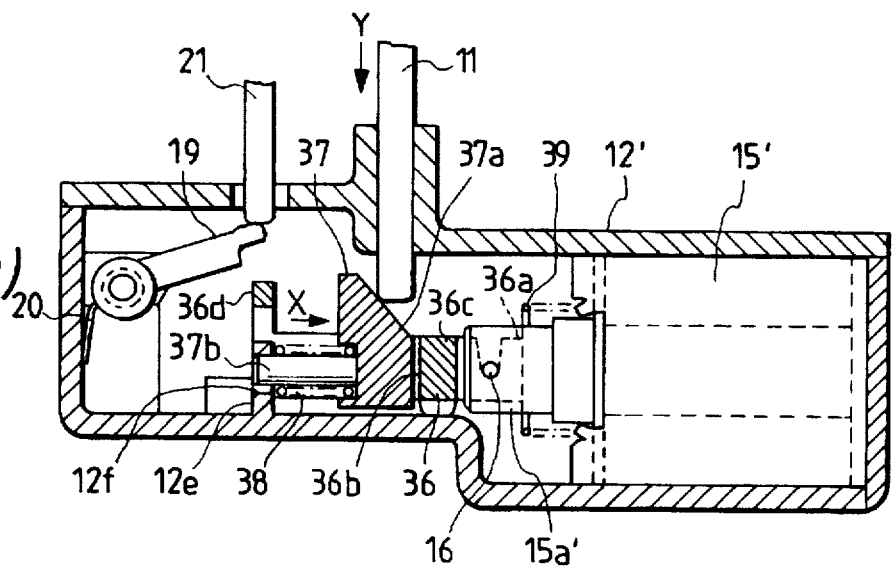
FIGS. 10 (a) to (c) are longitudinal sectional side views showing a fifth embodiment of the invention in different conditions.
Figure 10B:
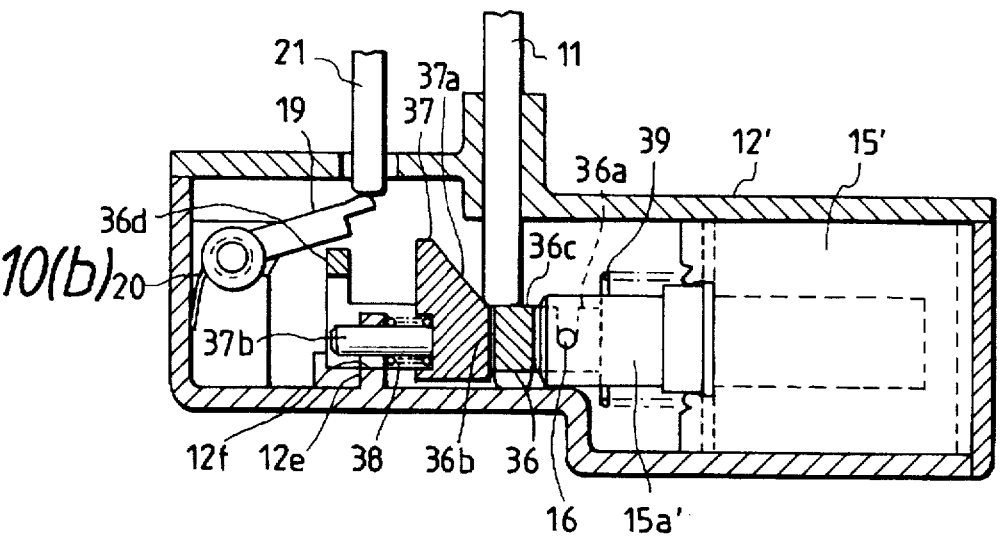
Figure 10C:
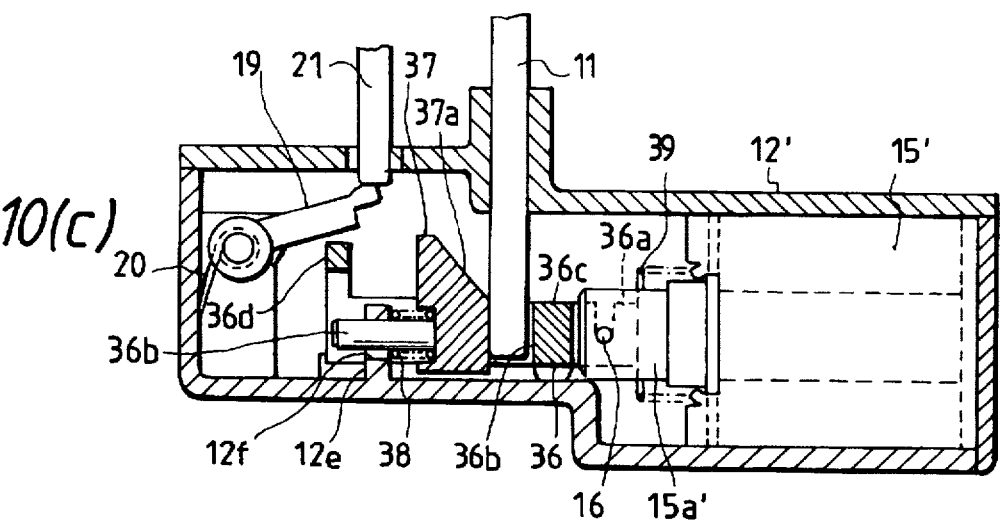

FIG. 10 shows a fifth embodiment of the invention. Only the differences between the first and fifth embodiments will be discussed.

A stopper plate 36 as a stopper member is installed in a case 12' movably in a direction perpendicular to the move direction of a lock plate 11. An arm part 36a also used as a spring bearing seat projected to one end of the stopper plate 36 is coupled via a pin 16 to a plunger 15a' of an electromagnetic solenoid 15'. The stopper plate 36 is formed like a frame having a through hole 36b to which the lock plate 11 can make access from the tip. It has a trapezoidal part 36c contiguous to the through hole 36b from the side of the electromagnetic solenoid 15'.

In this case, the stopper plate 36 can move back and forth between a lock position (see FIG. 10 (b)) where the trapezoidal part 36c is opposed to the tip of the lock plate 11 from downward and an unlock position (see FIG. 10 (a), (c)) where the trapezoidal part 36c is retracted from a move path of the tip of the lock plate 11, namely, the through hole 36b is opposed to the tip of the lock plate 11 from downward. A rising wall 36d abutted against a cancel lever 19 is located upright on the end opposite to the arm part 36a at the stopper plate 36.

A cam member 37 as a driven member movable between the trapezoidal part 36c and the rising wall 36d in the through hole 36b is located in the through hole 36b of the stopper plate 36. The cam member 37 comprises a cam face 37a facing the tip (lower end) of the lock plate 11 when the cam member 37 is in a position most moving to the side of trapezoidal part 36c. When the lock plate 11 is moved in the arrow Y direction, a move force in the opposite arrow X direction is given by cam action responsive to abutment of the tip against the cam face 37a.

The cam member 37 further includes a coupling pin 37b projected in a direction opposite to the cam face 37a and the coupling pin 37b is inserted into a through hole 12f made in a rising wall 12e formed integrally with the case 12'. A first compression coil spring 38 is wound surrounding the coupling pin 37b so as to exert a spring force in an elongation direction between the rising wall 12e and the cam member 37, whereby the cam member 37 receiving the spring force of the first compression coil spring 38 presses the stopper plate 36 in an unlock position direction (arrow X direction in FIG. 10 (a)) at the normal time.

A second compression coil spring 39 is wound surrounding the plunger 15a' of the electromagnetic solenoid 15' so as to exert a spring force in an elongation direction between the main part of the electromagnetic solenoid 15' and the arm part 36a of the stopper plate 36, whereby the second compression coil spring 39 energizes the stopper plate 36 in a lock position direction (opposite arrow X direction in FIG. 10 (a)) at the normal time.

In this case, the spring force of the second compression coil spring 39 is set to a smaller value than each of the spring force of the first compression coil spring 38 and the holding force of the plunger 15a' by the electromagnetic solenoid 15'. Therefore, the stopper plate 36 is pressed by the cam member 37 receiving the spring force of the first compression coil spring 38 and is held in the unlock position at the normal time.

Next, the operation of the structure of the embodiment will be discussed.

The stopper plate 36 is pressed by the cam member 37 and moved to the unlock position regardless of whether or not the electromagnetic solenoid 15' is energized, and the cam member 37 has the cam face 37a in a position opposed to the tip of the lock plate 11 (state in FIG. 10 (a)).

When the lock plate 11 is moved in the operational direction (arrow Y direction) as the detent knob (not shown) is pressed from the state, the cam member 37 is moved in the opposite arrow X direction against the spring force of the first compression coil spring 38 by cam action responsive to abutment of the tip of the lock plate 11 against the cam face 37a of the cam member 37. In response to this, the cam member 37 is displaced to a position where pressing the stopper plate 36 is released, allowing the stopper plate 36 to move in the lock position direction (opposite arrow X direction).

When the detent knob is pressed, if the electromagnetic solenoid 15' is powered off, the stopper plate 36 is moved to the lock position by the spring force of the second compression coil spring 39. When the stopper plate 36 is thus moved to the lock position, as shown in FIG. 10 (b), the tip of the lock plate 11 abuts the trapezoidal part 36c of the stopper plate 36, inhibiting the lock plate 11 from moving, thus more pressing the detent knob is made ineffective.

In contrast, when the detent knob is pressed, if the electromagnetic solenoid 15' is energized, it attracts and holds the plunger 15a'. At this time, since the spring force of the second compression coil spring 39 is set to a smaller value than the holding force of the plunger 15a' by the electromagnetic solenoid 15', even when the cam member 37 is displaced as described above in response to handling of the detent knob and a move of the stopper plate 36 in the lock position direction is allowed, the stopper plate 36 remains held in the unlock position against the spring force of the second compression coil spring 39 by the holding force of the plunger 15a', as shown in FIG. 10 (c).

Thus, the through hole 36b of the stopper plate 36 faces the tip of the lock plate 11 (namely, substantially the stopper plate 36 is retracted from the move path of the lock plate 11) and the lock plate 11 makes access to the through hole 36b, allowing the lock plate 11 to move in the arrow Y direction for making pressing the detent knob effective.

Also in the embodiment, the electromagnetic solenoid 15' needs only to hold the stopper plate 36 held in the unlock position at the normal time in the unlock position against a comparatively small spring force of the second compression coil spring 39 and need not perform suction operation against the spring force as in the conventional structure, and therefore can be miniaturized. Moreover, when the electromagnetic solenoid 15' is energized, the plunger 15a' does not move, so that operation noise associated with the move does not occur, preventing noise from increasing. Since the cam action of the cam member 37 is used to transmit the move force between the lock plate 11 and the stopper plate 36, the move force can be transmitted reliably.

Sixth Embodiment

FIGS. 11 to 16 show a sixth embodiment of the invention producing a similar effect to that of the first embodiment. Only the differences between the first and sixth embodiments will be discussed.

Figure 11:
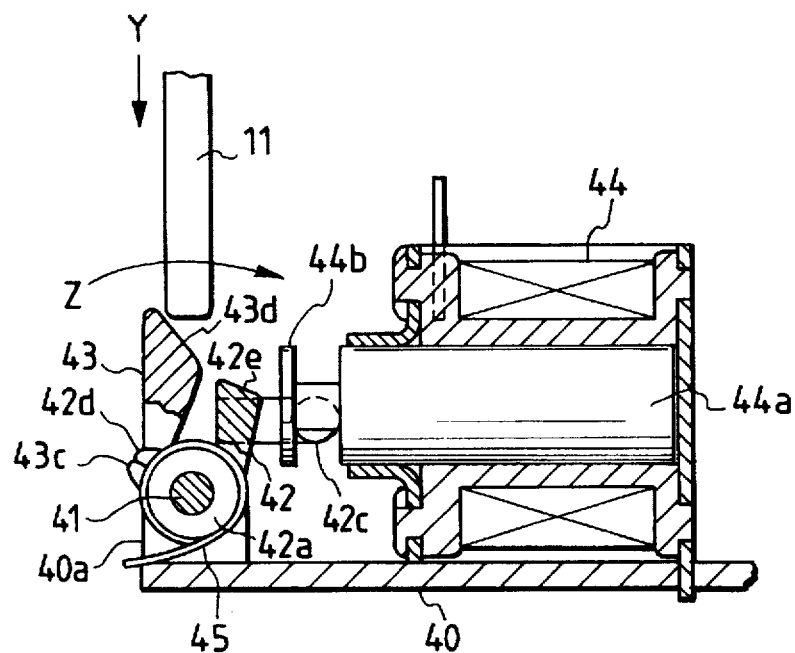
FIG. 11 is a longitudinal sectional view of a main part showing a sixth embodiment of the invention.
Figure 12:
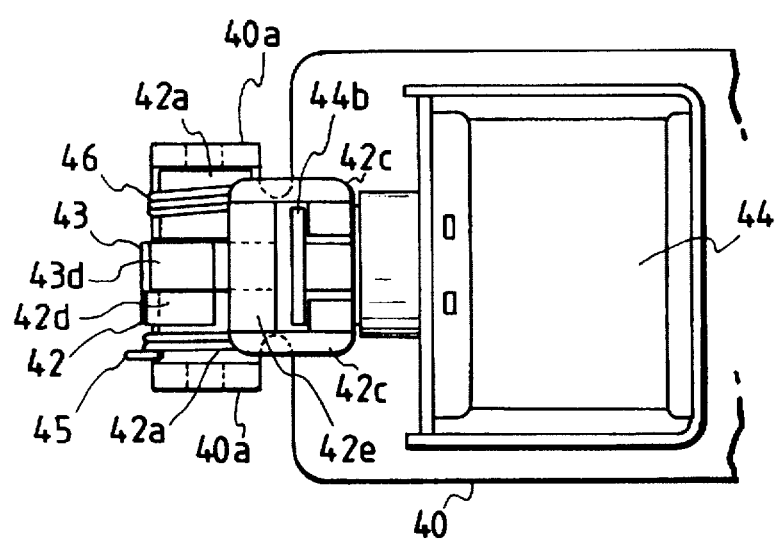
FIG. 12 is a plan view of the main part in FIG. 11.
Figure 13:
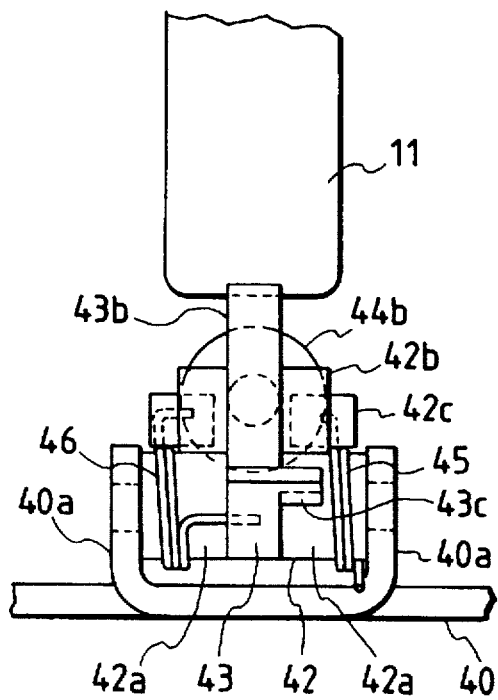
FIG. 13 is a front view of the main part in FIG. 11.

In FIGS. 11 to 13, for example, a metal stay 40 is formed with a pair of support projection pieces 40a and 40a and a stopper lever 42 as a stopper member and a cam lever 43 as a driven member are supported on a support shaft 41 placed on the support projection pieces 40a pivotably in an arrow Z direction and an opposite arrow Z direction in FIG. 11.

Figure 14A:
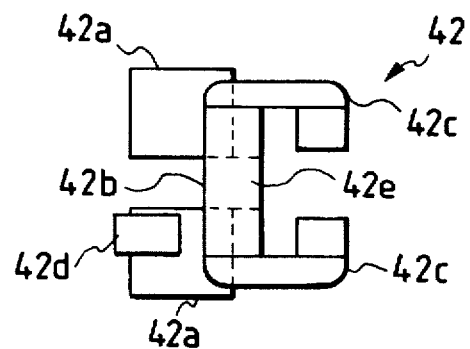
FIGS. 14 (a) and (b) are a plan view and a side view of a stopper lever, respectively.
Figure 14B:
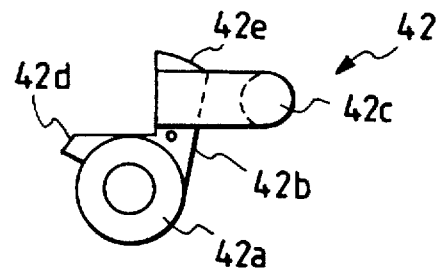

In this case, the stopper lever 42 has a form comprising a pair of collars 42a and 42a spaced from each other in a predetermined gap, a lever main part 42b projected from the collars 42a, a pair of engagement arms 42c projected from both sides of the lever main part 42b, and a pawl part 42d formed on the outer peripheral surface of one of the collars 42a as one piece, as shown in FIG. 14. The tip face of the lever main part 42b functions as a stopper face 42e abutting the tip of lock plate 11.

Figure 16A:
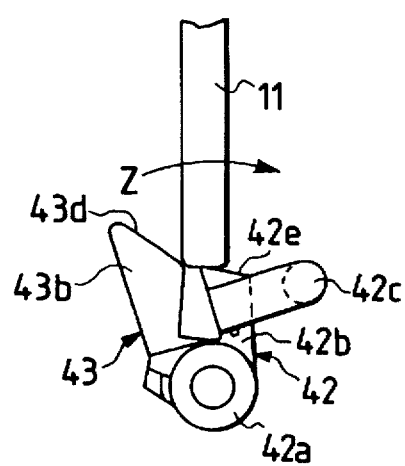
FIG. 16 (a) and (b) are side views showing the main part in different conditions.
Figure 16B:
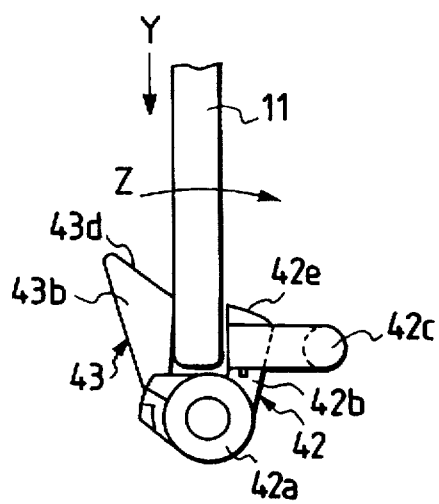

The stopper lever 42 having the structure pivotally travels between a lock position (see FIG. 16 (a)) where the stopper face 42e is opposed to the tip of the lock plate 11 from downward with the collar 42a fitted around the support shaft 41 and an unlock position (see FIGS. 11 and 16 (b)) where the stopper face 42e is retracted from the move path of the lock plate 11.

Figure 15A:
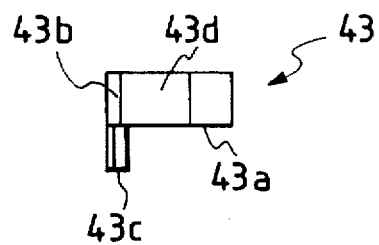
FIGS. 15 (a) and (b) are a plan view and a side view of a cam lever, respectively.
Figure 15B:
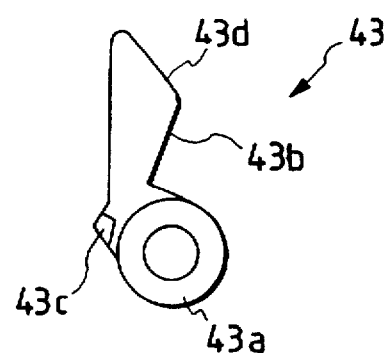

The cam lever 43 has a form comprising a collar 43a of a form entering the gap between the collars 42a and 42a of the stopper lever 42, a lever main part 43b projected from the collar 43a, and a pawl part 43c projected from the base side face of the lever main part 43b and abutting the pawl part 42d of the stopper lever 42 in an arrow Z direction as one piece, as shown in FIG. 15. The tip face of the lever main part 43b functions as a cam face 43d abutting the tip of lock plate 11.

The cam lever 43 having the structure pivotally travels between an operational position (see FIG. 11) where the cam face 43d is opposed to the tip of the lock plate 11 from downward with the collar 43a fitted around the support shaft 41 and a nonoperational position (see FIG. 16 (a), (b)) where the cam face 43d is retracted from the move path of the lock plate 11.

An electromagnetic solenoid 44 is fixed on the stay 40 by caulking means, etc., and a flange part 44b located in a plunger 44a of the electromagnetic solenoid 44 is engaged in the engagement arm 42c of the stopper lever 42 for coupling the electromagnetic solenoid 44 to the stopper lever 42.

A first torsion coil spring 45 is wound on one of the pair of collars 42a of the stopper lever 42 so as to exert a spread force between the stopper lever 42 and the stay 40, whereby the stopper lever 42 is energized in an unlock position direction (arrow Z direction) at the normal time.

A second torsion coil spring 46 is wound on the other of the pair of collars 42a of the stopper lever 42. The torsion coil spring 46 has one end coupled to the cam lever 43 and the other end coupled to the stopper lever 42, so that a force by which the lever main parts 43b and 42b pivot in mutual proximity direction is exerted between the cam lever 43 and the stopper lever 42, whereby the cam lever 43 is coupled via the second torsion coil spring 46 to the stopper lever 42 and at the normal time, is energized and held in the operational position where the cam face 43d is opposed to the tip of the lock plate 11.

In this case, the second torsion coil spring 46 has a spring force larger than the first torsion coil spring 45 and the spring force is set so as to become smaller than the resultant force of the holding force of the plunger 44a by the electromagnetic solenoid 44 and the spring force of the first torsion coil spring 45. The pawl parts 42d and 43c of the stopper lever 42 and the cam lever 43 have a function of holding the gap between the lever main parts 42b and 43b in response to their mutual abutment.

According to the embodiment having the structure, the stopper lever 42, which is energized in the unlock position direction by the first torsion coil spring 45 at the normal time, is held in the unlock position regardless of whether or not the electromagnetic solenoid 44 is energized. When the lock plate 11 is moved in the arrow Y direction in FIG. 11 as a detent knob (not shown) is pressed from the state, a move force in the opposite arrow Z direction is given to the cam lever 43 by cam action responsive to abutment of the tip of the lock plate 11 against the cam face 43d of the cam lever 43. The move force is applied to the stopper lever 43 through the second torsion coil spring 46.

When the detent knob is pressed, if the electromagnetic solenoid 44 is powered off, the force holding the stopper lever 42 in the unlock position is only the spring force of the first torsion coil spring 45. Since the spring force is set smaller than the spring force of the second torsion coil spring 46, when the cam lever 43 is pivoted in the opposite arrow Z direction as the detent knob is pressed as described above, the stopper lever 42 is also pivoted in the opposite arrow Z direction, namely, a lock position direction against the first torsion coil spring 45, as shown in FIG. 16 (a).

When the stopper lever 42 is thus pivoted to the lock position, the tip of the lock plate 11 abuts the stopper face 42e of the stopper lever 42, inhibiting the lock plate 11 from moving, thus pressing the detent knob is made ineffective.

In contrast, when the detent knob is pressed, if the electromagnetic solenoid 44 is energized, it attracts and holds the plunger 44a. In this state, the force holding the stopper lever 42 in the unlock position is the resultant force of the force holding the plunger 44a by the electromagnetic solenoid 44 and the spring force of the first torsion coil spring 45. In this case, since the spring force of the second torsion coil spring 46 is set to a smaller value than the resultant force, when the move force in the lock position direction is given to the stopper lever 42 in response to pressing the detent knob, only the cam lever 43 is moved in the opposite arrow Z direction in response to deformation of the second torsion coil spring 46 and the stopper lever 42 remains held in the unlock position, as shown in FIG. 16 (b). Thus, the stopper face 42e of the stopper lever 42 is retracted from the move path of the lock plate 11, allowing the lock plate 11 to move in the arrow Y direction for making pressing the detent knob effective.

Seventh Embodiment

Figure 17:
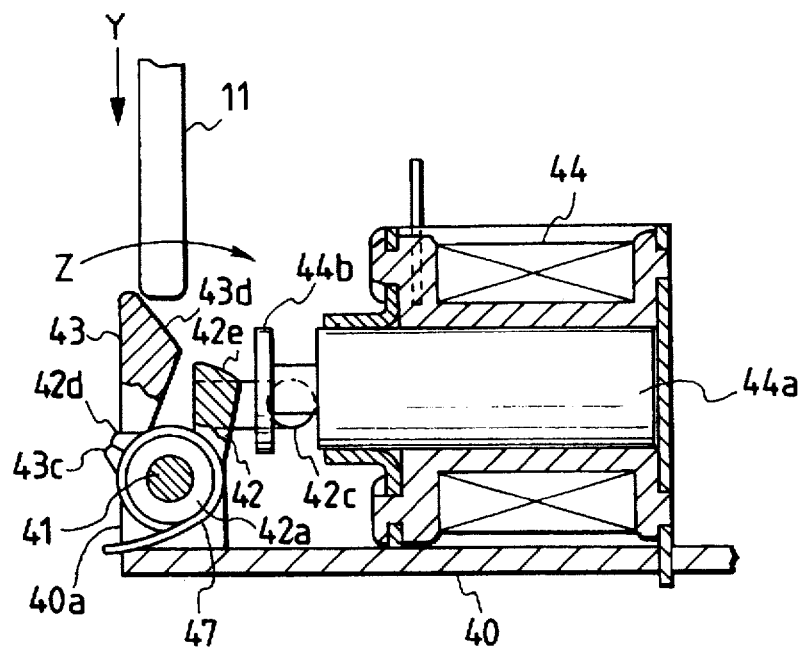
FIG. 17 is a longitudinal sectional side view of a main part showing a seventh embodiment of the invention.
Figure 18:
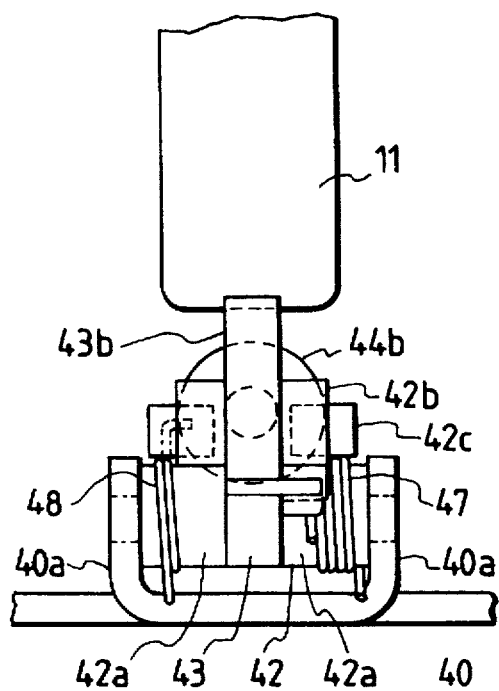
FIG. 18 is a front view of the main part in FIG. 17.

FIGS. 17 and 18 show a seventh embodiment of the invention provided by modifying the sixth embodiment of the invention. Only the differences between the sixth and seventh embodiments will be discussed.

The seventh embodiment of the invention is characterized by the fact that it comprises a first torsion coil spring 47 and a second torsion coil spring 48 in place of the first torsion coil spring 45 and the second torsion coil spring 46 in the sixth embodiment of the invention.

In this case, the first torsion coil spring 47 is wound on one of a pair of collars 42a of a stopper lever 42 so as to exert a spread force between a cam lever 43 and a stay 40, whereby the cam lever 43 receiving the spring force of the first torsion coil spring 47 presses the stopper lever 42 in an unlock position direction (arrow Z direction) via pawl parts 43c and 42d at the normal time.

The second torsion coil spring 48 (see FIG. 18) is wound on the other of the pair of collars 42a of the stopper lever 42 so as to exert a spread force between the stopper lever 42 and the stay 40, whereby the stopper lever 42 is energized in a lock position direction (opposite arrow Z direction) at the normal time.

In this case, the spring force of the second torsion coil spring 48 is set to a smaller value than each of the spring force of the first torsion coil spring 47 and the holding force of the plunger 44a by the electromagnetic solenoid 44. Therefore, the stopper lever 42 is pressed via the pawl parts 43c and 42d by the cam lever 43 receiving the spring force of the first torsion coil spring 47 and is held in the unlock position at the normal time, as shown in FIG. 17.

In the seventh embodiment having the structure, when a lock plate 11 is moved in the operation direction (arrow Y direction) as a detent knob (not shown) is pressed from the state in which the stopper lever 42 is held in the unlock position (the state shown in FIG. 17), the cam lever 43 is pivoted in the opposite arrow Z direction against the spring force of the first torsion coil spring 47 by cam action responsive to abutment of the tip of the lock plate 11 against a cam face 43d of the cam lever 43. In response to this, the cam lever 43 is displaced to a position where pressing the stopper lever 42 is released, allowing the stopper lever 42 to move in the lock position direction (opposite arrow Z direction).

When the detent knob is pressed, if the electromagnetic solenoid 44 is powered off, the stopper lever 42 is moved to the lock position by the spring force of the second torsion coil spring 48. When the stopper lever 42 is thus moved to the lock position, the tip of the lock plate 11 abuts a stopper face 42e of the stopper lever 42, inhibiting the lock plate 11 from moving, thus more pressing the detent knob is made ineffective.

In contrast, when the detent knob is pressed, if the electromagnetic solenoid 44 is energized, it attracts and holds the plunger 44a. At this time, since the spring force of the second torsion coil spring 48 is set to a smaller value than the holding force of the plunger 44a by the electromagnetic solenoid 44, even when the cam lever 43 is displaced as described above in response to handling of the detent knob and a move of the stopper lever 42 in the lock position direction is allowed, the stopper lever 42 remains held in the unlock position against the spring force of the second torsion coil spring 48 by the holding force of the plunger 44a. Thus, the lock plate 11 is allowed to move in the arrow Y direction for making pressing the detent knob effective.

Eighth Embodiment

Figure 19:
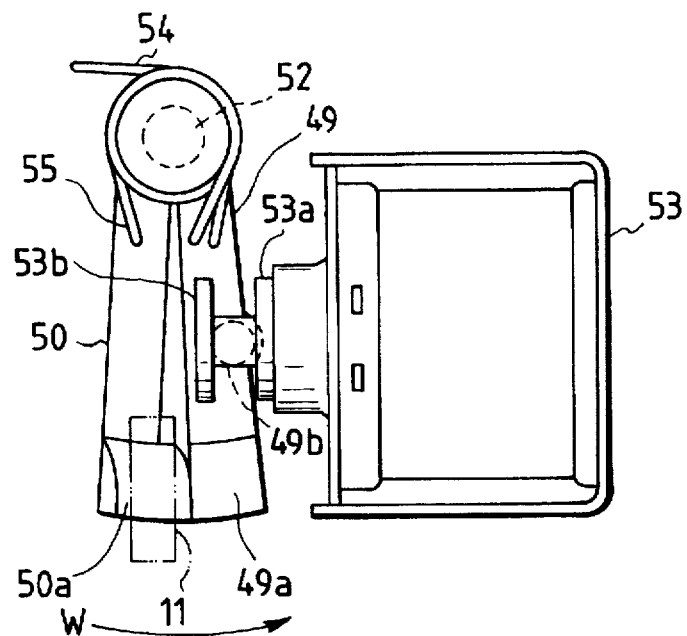
FIG. 19 is a plan view showing an eighth embodiment of the invention.
Figure 20:
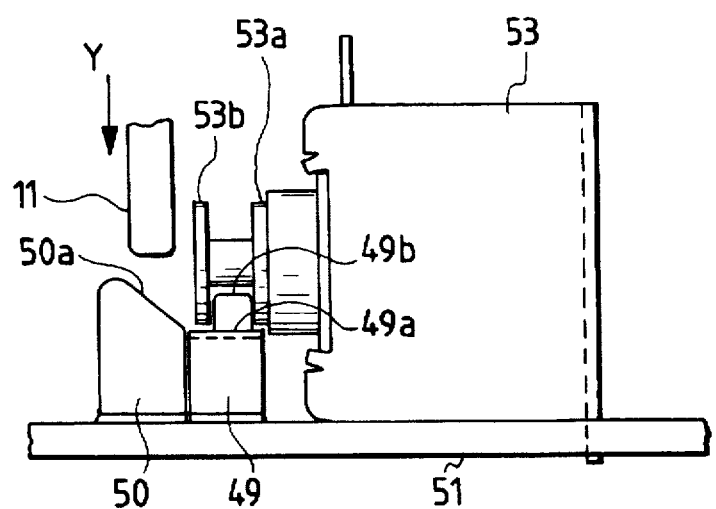
FIG. 20 is a side view of the eighth embodiment of the invention in FIG. 19.

FIGS. 19 and 20 show an eighth embodiment of the invention producing a similar effect to that of the first embodiment. Only the differences between the first and eighth embodiments will be discussed.

A stopper lever 49 as a stopper member and a cam lever 50 as a driven member are supported pivotably on a support shaft 52 located upright on a stay 51 in arrow W and opposite arrow W directions in FIG. 19 parallel with the stay 51.

Specifically, the stopper lever 49 travels pivotally between a lock position where a stopper face 49a formed on the tip of the stopper lever 49 is opposed to the tip of a lock plate 11 from downward and an unlock position (state shown in FIGS. 19 and 20) where the stopper face 49a is retracted from a move path of the lock plate 11.

The cam lever 50 travels pivotally between an operational position (state in FIGS. 19 and 20) where a cam face 50a formed on the tip of the cam lever 50 is opposed to the tip of the lock plate 11 from downward and a nonoperational position where the cam face 50a is retracted in the opposite arrow W direction from the move path of the lock plate 11.

An electromagnetic solenoid 53 is fixed on the stay 51 by caulking means, etc., and a pin 49b located upright on the stopper lever 49 is engaged between a plunger 53a of the electromagnetic solenoid 53 and a flange part 53b located in the plunger 53a for coupling the electromagnetic solenoid 53 to the stopper lever 49.

A first torsion coil spring 54 is wound around the support shaft 52 so as to exert a spread force between the stopper lever 49 and the stay 51, whereby the stopper lever 49 is energized in an unlock position direction (arrow W direction) at the normal time.

A second torsion coil spring 55 located coaxially with the first torsion coil spring 54 is wound. It has one end coupled to the cam lever 50 and the other end coupled to the stopper lever 49, whereby the cam lever 50 is coupled via the second torsion coil spring 55 to the stopper lever 49 and at the normal time, is energized and held in the operational position where the cam face 50a is opposed to the tip of the lock plate 11.

In this case, the second torsion coil spring 55 has a spring force larger than the first torsion coil spring 54 and the spring force is set so as to become smaller than the resultant force of the holding force of the plunger 53a by the electromagnetic solenoid 53 and the spring force of the first torsion coil spring 54.

According to the embodiment having the structure, when the lock plate 11 is moved in the arrow Y direction in FIG. 20 as a detent knob (not shown) is pressed from the state shown in FIGS. 19 and 20, a move force in the opposite arrow Z direction is given to the cam lever 50 by cam action responsive to abutment of the tip of the lock plate 11 against the cam face 50a of the cam lever 50. The move force is applied to the stopper lever 49 through the second torsion coil spring 55.

When the detent knob is pressed, if the electromagnetic solenoid 53 is powered off, the force holding the stopper lever 49 in the unlock position is only the spring force of the first torsion coil spring 54. Since the spring force is set smaller than the spring force of the second torsion coil spring 55, when the cam lever 50 is pivoted in the opposite arrow W direction as the detent knob is pressed as described above, the stopper lever 49 is also pivoted in the opposite arrow W direction, namely, a lock position direction against the first torsion coil spring 54.

When the stopper lever 49 is thus pivoted to the lock position, the tip of the lock plate 11 abuts the stopper face 49a of the stopper lever 49, inhibiting the lock plate 11 from moving, thus pressing the detent knob is made ineffective.

In contrast, when the detent knob is pressed, if the electromagnetic solenoid 53 is energized, it attracts and holds the plunger 53a. In this state, the force holding the stopper lever 49 in the unlock position is the resultant force of the force holding the plunger 53a by the electromagnetic solenoid 53 and the spring force of the first torsion coil spring 54. In this case, since the spring force of the second torsion coil spring 55 is set to a smaller value than the resultant force, when the move force in the lock position direction is given to the stopper lever 49 in response to pressing the detent knob, only the cam lever 50 is moved in the opposite arrow W direction in response to deformation of the second torsion coil spring 55 and the stopper lever 49 remains held in the unlock position. Thus, the stopper face 49a of the stopper lever 49 is retracted from the move path of the lock plate 11, allowing the lock plate 11 to move in the arrow Y direction for making pressing the detent knob effective.

Ninth Embodiment

Figure 21:
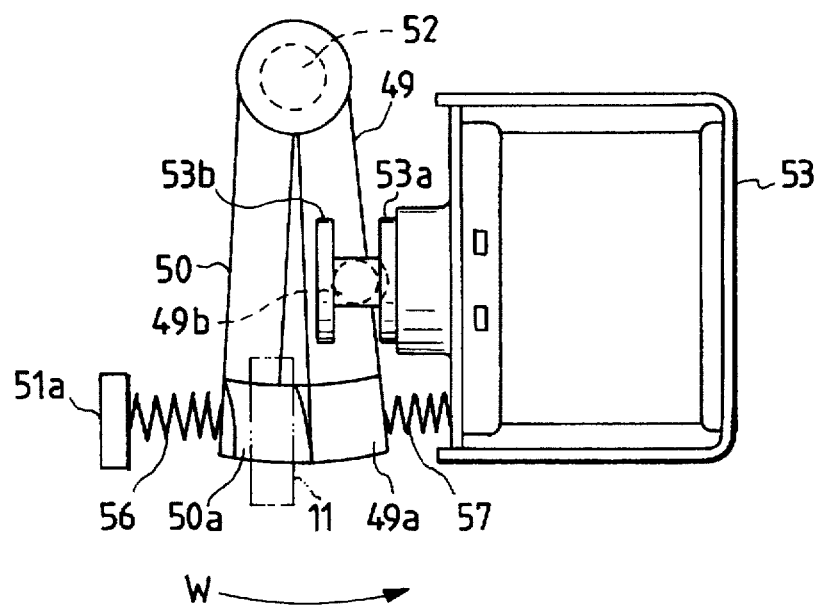
FIG. 21 is a plan view showing a ninth embodiment of the invention.

FIGS. 21 shows a ninth embodiment of the invention provided by modifying the eighth embodiment of the invention. Only the differences between the eighth and ninth embodiments will be discussed.

The ninth embodiment of the invention is characterized by the fact that it comprises a first compression coil spring 56 and a second compression coil spring 57 in place of the first torsion coil spring 54 and the second torsion coil spring 55 in the eighth embodiment of the invention.

In this case, the first compression coil spring 56 intervenes so as to exert an elongation force between a cam lever 50 and a projection 51a formed on a stay 51, whereby the cam lever 50 receiving the spring force of the first compression coil spring 56 presses the stopper lever 49 in an unlock position direction (arrow W direction) at the normal time.

The second compression coil spring 57 intervenes so as to exert an elongation force between a stopper lever 49 and an electromagnetic solenoid 53, whereby the stopper lever 49 is energized in a lock position direction (opposite arrow W direction) at the normal time.

In this case, the spring force of the second compression coil spring 57 is set to a smaller value than each of the spring force of the first compression coil spring 56 and the holding force of the plunger 53a by the electromagnetic solenoid 53. Therefore, the stopper lever 49 is pressed by the cam lever 43 receiving the spring force of the first compression coil spring 56 and is held in the unlock position at the normal time, as shown in FIG. 21.

In the ninth embodiment having the structure, when a lock plate 11 is moved in the operation direction as a detent knob (not shown) is pressed from the state in which the stopper lever 49 is held in the unlock position (the state shown in FIG. 21), the cam lever 50 is pivoted in the opposite arrow W direction against the spring force of the first compression coil spring 56 by cam action responsive to abutment of the tip of the lock plate 11 against a cam face 50a of the cam lever 50. In response to this, the cam lever 50 is displaced to a position where pressing the stopper lever 49 is released, allowing the stopper lever 49 to move in the lock position direction (opposite arrow W direction).

When the detent knob is pressed, if the electromagnetic solenoid 53 is powered off, the stopper lever 49 is moved to the lock position by the spring force of the second compression coil spring 57. When the stopper lever 49 is thus moved to the lock position, the tip of the lock plate 11 abuts a stopper face 49a of the stopper lever 42, inhibiting the lock plate 11 from moving, thus more pressing the detent knob is made ineffective.

In contrast, when the detent knob is pressed, if the electromagnetic solenoid 53 is energized, it attracts and holds the plunger 53a. At this time, since the spring force of the second compression coil spring 57 is set to a smaller value than the holding force of the plunger 53a by the electromagnetic solenoid 53, even when the cam lever 50 is displaced as described above in response to handling of the detent knob and a move of the stopper lever 49 in the lock position direction is allowed, the stopper lever 49 remains held in the unlock position against the spring force of the second compression coil spring 57 by the holding force of the plunger 53a. Thus, the lock plate 11 is allowed to move for making pressing the detent knob effective.

In the embodiment, the function of the first and second compression coil springs 56 and 57 may be provided by torsion coil springs wound around a support shaft 52.

Tenth Embodiment

FIGS. 22 to 26 show a tenth embodiment of the invention producing a similar effect to that of the first embodiment. Only the differences between the first and tenth embodiments will be discussed.

Figure 22:
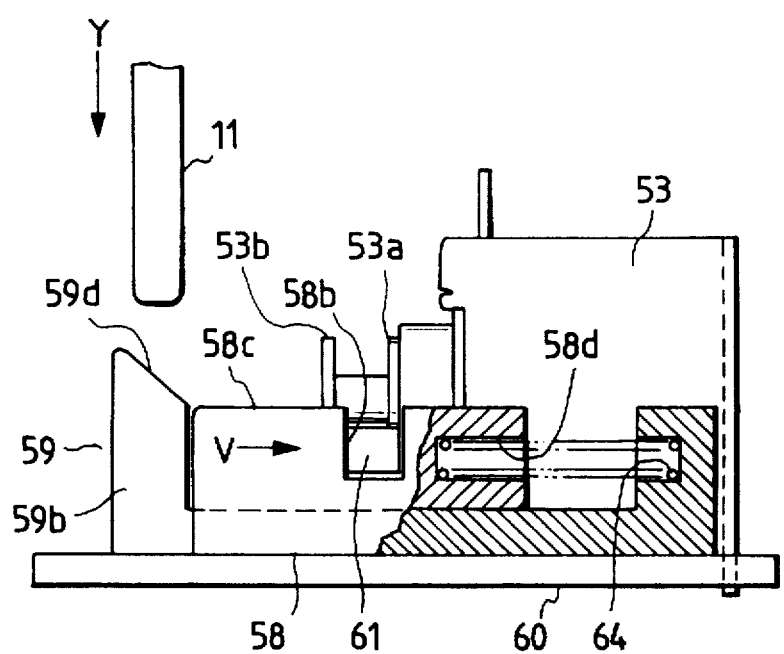
FIG. 22 is a side view partly broken away to show a tenth embodiment of the invention.

A stopper block 58 as a stopper member and a cam member 59 as a driven member are placed on a stay 60 so that it can be moved linearly in arrow V and opposite arrow V directions in FIG. 22.

Figure 25:
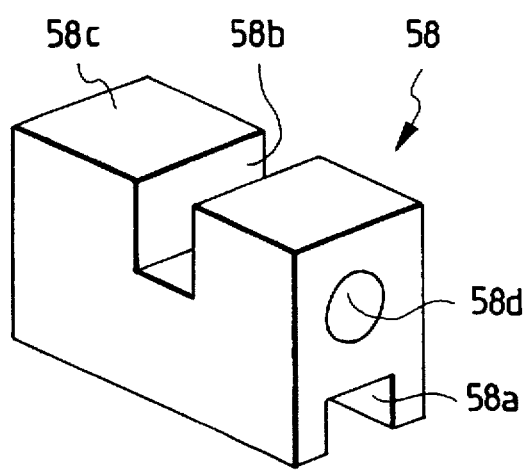
FIG. 25 is a perspective view of a stopper block.

In this case, the stopper block 58 has a lower face formed with a groove 58a for guiding a move of the cam member 59 and an upper face formed with a notch 58b oriented in a direction perpendicular to the move direction and one portion of the upper face defined by the notch 58b functions as a stopper face 58c abutting the tip of a lock plate 11, as shown in FIG. 25. Specifically, the stopper block 58 moves back and forth between a lock position where a stopper face 58c of the stopper block 58 is opposed to the tip of the lock plate 11 from downward and an unlock position (state shown in FIGS. 22 and 23) where the stopper face 58c is retracted from a move path of the lock plate 11. A spring receiving recess 58d is formed in an end face of the stopper block 58, particularly the end face opposite to the stopper face 58c. The stopper block 58 is guided by guide means (not shown) for making a linear move.

Figure 26:
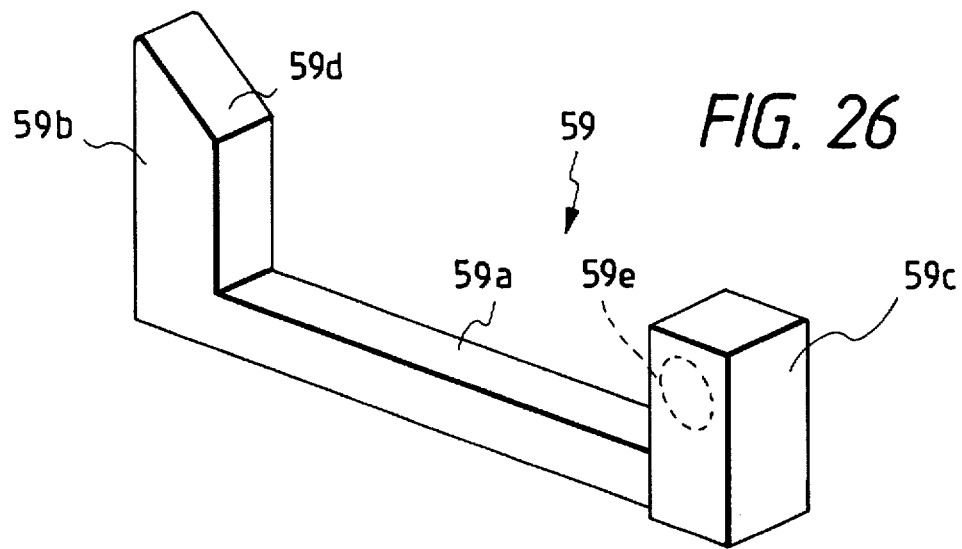
FIG. 26 is a perspective view of a cam member.

As shown in FIG. 26, the cam member 59 comprises a guide bar 59a inserted in the groove 58a of the stopper block 58, a cam projection 59b formed integrally on one end of the guide bar 59a, and a detachment prevention projection 59c formed integrally on the other end of the guide bar 59a; it travels pivotally between an operational position (state in FIGS. 22 and 23) where a cam face 59d formed on the cam projection 59b is opposed to the tip of the lock plate 11 from downward and a nonoperational position where the cam face 59d is retracted in the opposite arrow V direction from the move path of the lock plate 11. The detachment prevention projection 59c of the cam member 59 is formed with a spring receiving recess 59e opposed to the recess 58d of the stopper block 58.

Figure 23:
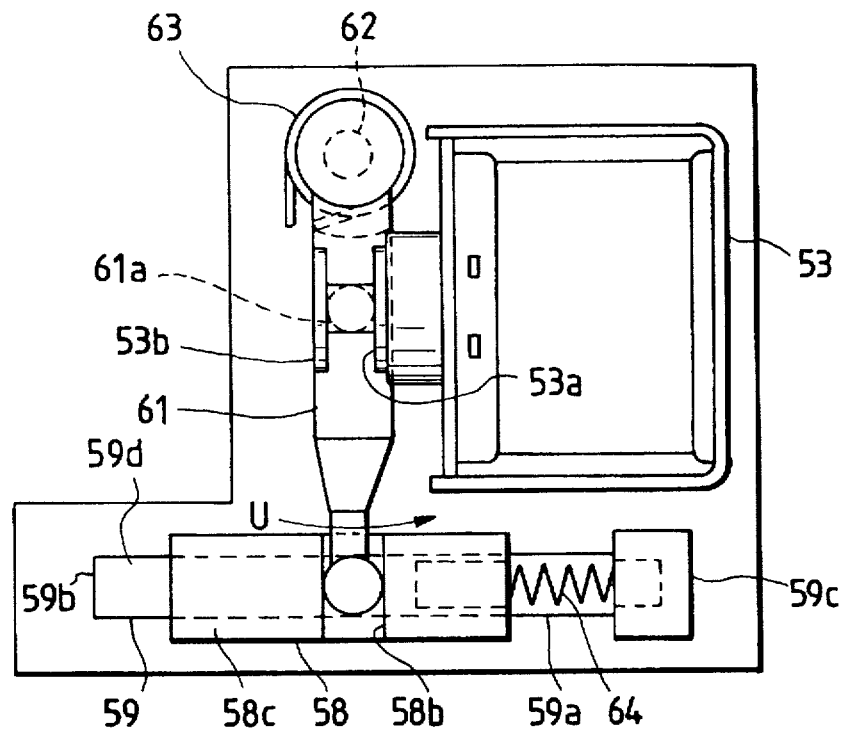
FIG. 23 is a plan view of the tenth embodiment of the invention.
Figure 24:
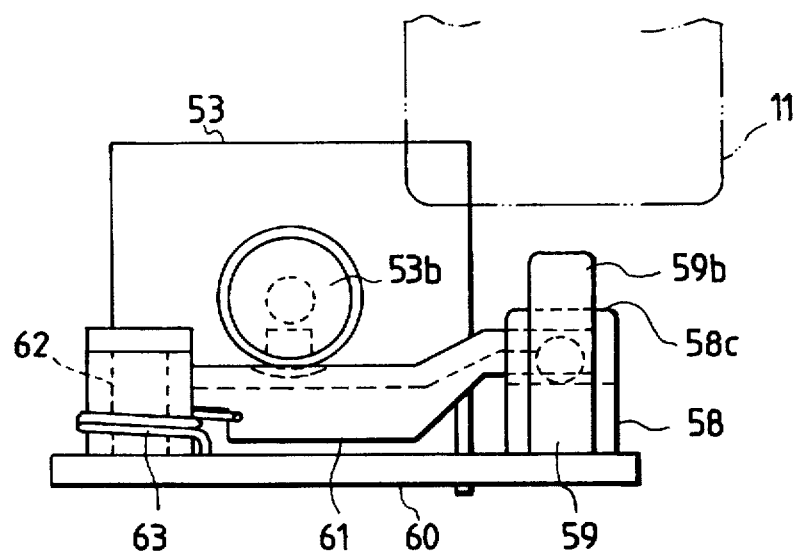
FIG. 24 is a front view of the tenth embodiment of the invention.

On the other hand, an arm 61 is mounted on the stay 60 pivotably about a support shaft 62 as a supporting point in arrow U and opposite arrow U directions in FIG. 23. The tip of the arm 61 is engaged slidably in the notch 58b of the stopper block 58 and as it travels pivotally, the stopper block 58 moves back and forth in the arrow V and opposite arrow V directions.

An electromagnetic solenoid 53 is fixed on the stay 60 by caulking means, etc., and a pin 61a located upright on the arm 61 is engaged between a plunger 53a of the electromagnetic solenoid 53 and a flange part 53b for coupling the electromagnetic solenoid 53 to the arm 61.

A torsion coil spring 63 is wound around the support shaft 62 so as to energize the arm 61 in the arrow U direction. A compression coil spring 64 is installed between the recess 58d on the stopper block 58 and the recess 59e on the cam member 59 so as to exert an elongation force therebetween, whereby the cam member 59 is coupled via the compression coil spring 64 to the stopper block 58 and at the normal time, is energized and held in the operational position where the cam face 59d is opposed to the tip of the lock plate 11.

In this case, the compression coil spring 64 has a spring force larger than the torsion coil spring 63 and the spring force is set so as to become smaller than the resultant force of the holding force of the plunger 53a by the electromagnetic solenoid 53 and the spring force of the torsion coil spring 63.

According to the embodiment having the structure, when the lock plate 11 is moved in an arrow Y direction in FIG. 22 as a detent knob (not shown) is pressed from the state shown in FIGS. 22 and 23, a move force in the opposite arrow V direction is given to the cam member 59 by cam action responsive to abutment of the tip of the lock plate 11 against the cam face 59d of the cam member 59. The move force is applied to the stopper block 58 through the compression coil spring 64.

When the detent knob is pressed, if the electromagnetic solenoid 53 is powered off, the force holding the stopper block 58 in the unlock position is only the spring force of the torsion coil spring 63. Since the spring force is set smaller than the spring force of the compression coil spring 64, when the cam member 59 is pivoted in the opposite arrow V direction as the detent knob is pressed as described above, the stopper block 58 is also pivoted in the opposite arrow V direction, namely, a lock position direction against the torsion coil spring 63.

When the stopper block 58 is thus pivoted to the lock position, the tip of the lock plate 11 abuts the stopper face 58c of the stopper block 58, inhibiting the lock plate 11 from moving, thus pressing the detent knob is made ineffective.

In contrast, when the detent knob is pressed, if the electromagnetic solenoid 53 is energized, it attracts and holds the plunger 53a. In this state, the force holding the stopper block 58 in the unlock position is the resultant force of the force holding the plunger 53a by the electromagnetic solenoid 53 and the spring force of the torsion coil spring 63. In this case, since the spring force of the compression coil spring 64 is set to a smaller value than the resultant force, when the move force in the lock position direction is given to the stopper block 58 in response to pressing the detent knob, only the cam member 59 is moved in the opposite arrow V direction in response to deformation of the compression coil spring 64 and the stopper block 58 remains held in the unlock position. Thus, the stopper face 58c of the stopper block 58 is retracted from the move path of the lock plate 11, allowing the lock plate 11 to move in the arrow Y direction for making pressing the detent knob effective.

Figure 27:
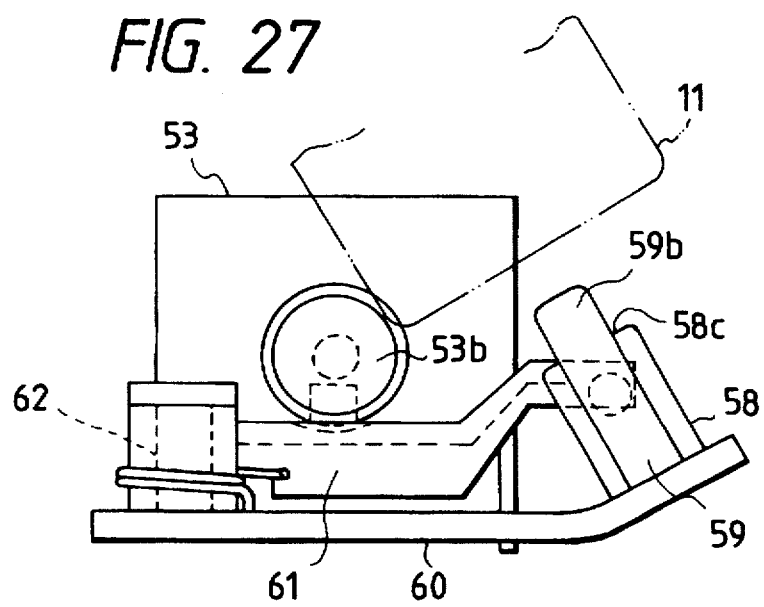
FIG. 27 is a front view showing an eleventh embodiment of the invention.
Figure 28:
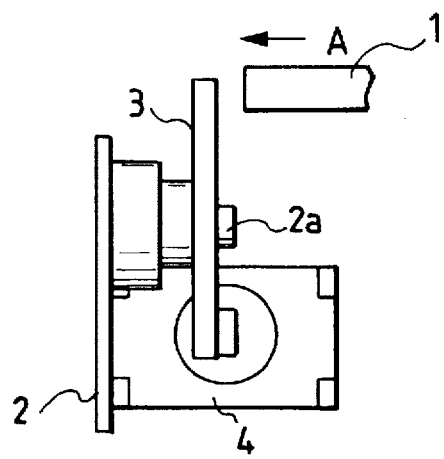
FIG. 28 is a front view showing a main part of a conventional example.
Figure 29:
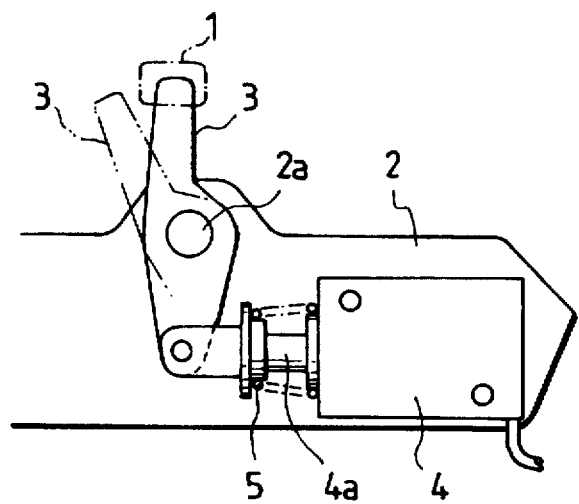
FIG. 29 is a side view of the main part in FIG. 28.

As in FIG. 27 showing an eleventh embodiment of the invention, a stay 60' of a structure in which a stopper block 58 and cam member location are bent to the side of an arm 61 may be installed in place of the stay 60 in the tenth embodiment. Such a structure would enable the electromagnetic solenoid 53, a large part, to be placed in an inclination condition to the lock plate 11 move direction, improving space efficiency and housing property of the device.

The invention is not limited to the embodiments described above and the combination and arrangement of parts may be resorted to without departing from the spirit and the scope of the invention. For example, it can be applied not only to automobile shift locking devices, but also to general vechile locking devices using an electromagnetic solenoid.

According to the invention, the configuration is adopted comprising a stopper member movable back and force between a lock position where when an interlocking member is moved in a predetermined operational direction in response to operation of an operational member, the stopper member abuts the interlocking member for inhibiting the interlocking member from moving and an unlock position where the stopper member retracts from a move path of the interlocking member for allowing the interlocking member to move, an electromagnetic solenoid for holding the stopper member in the unlock position when the electromagnetic solenoid is energized, first spring means for energizing the stopper member in a direction of the unlock position at the normal time, and a driven member being coupled to the stopper member via second spring means having a spring force larger than the first spring means for giving a move force in a direction of the lock position to the stopper member through the second spring means in response to a move of the interlocking member in the operational direction, wherein the spring force of the second spring means is set to a smaller value than a resultant force of a plunger holding force by the electromagnetic solenoid and the spring force of the first spring means, or the configuration is adopted comprising a stopper member movable back and force between a lock position where when an interlocking member is moved in a predetermined operational direction in response to operation of an operational member, the stopper member abuts the interlocking member for inhibiting the interlocking member from moving and an unlock position where the stopper member retracts from a move path of the interlocking member for allowing the interlocking member to move, an electromagnetic solenoid for holding the stopper member in the unlock position when the electromagnetic solenoid is energized, a driven member for pressing the stopper member by a spring force of first spring means for holding the stopper member in the unlock position at the normal time, the driven member being displaced to a position where pressing the stopper member is released in response to a move of the interlocking member in the operational direction, allowing the stopper member to move in a direction of the lock position, and second spring means for energizing the stopper member in the lock position direction at the normal time, wherein a spring force of the second spring means is set to a smaller value than each of the spring force of the first spring means and a plunger holding force by the electromagnetic solenoid, whereby the electromagnetic solenoid needs only to generate a comparatively small force and can be miniaturized, producing a beneficial effect, as vehicle use, of being comparatively free of spatial restriction when the electromagnetic solenoid is installed and also producing an excellent effect of suppressing noise caused by the operation of the electromagnetic solenoid.

What is claimed is:

1. A vehicle locking device comprising:

an interlocking member moving in a predetermined operational direction in conjunciton with operation of an operational member;

a stopper member movable back and forth between a lock position where, when said interlocking member is moved in the operational direction, said stopper member abuts said interlocking member for inhibiting said interlocking member from moving and an unlock position where said stopper member retracts from a move path of said interlocking member for allowing said interlocking member to move;

an electromagnetic solenoid, having a plunger coupled to said stopper member for holding said stopper member in the unlock position when said electromagnetic solenoid is energized;

first spring means for energizing said stopper member in a direction parallel to the movement of the solenoid plunger and in a direction of the unlock position; and a driven member being coupled to said stopper member via second spring means having a spring force larger than said first spring means for giving a move force in a direction of the lock position to said stopper member through said second spring means in response to a move of said interlocking member in the operational direction.

2. The vehicle locking device as claimed in claim 1, wherein the spring force of said second spring means is set to a smaller value than a resultant force of a plunger holding force by said electromagnetic solenoid and the spring force of said first spring means.

3. The vehicle locking device as claimed in claim 1 wherein said driven member includes a cam member for giving the move force in the lock position direction to said stopper member through said second spring means by cam action responsive to abutment against said interlocking member when said interlocking member is moved in the operational direction.

* * * * *